Patented May 12, 1942

2,283,143

UNITED STATES PATENT OFFICE 2,283,143

ISOMERIZATION OF NORMAL BUTANE

Vladimir N. Ipatieff and Herman Pines, Chicago, Ill., assignors to Universal Oil Products Company, Chicago, Ill., a corporation of Delaware No Drawing. Application April 18, 1940, Serial No. 330,314

9 Claims. (Cl. 260—676)

This application is a continuation-in-part of our co-pending application Serial No. 103,383, filed September 30, 1936.

This invention relates to the treatment of butane of normal or straight-chain structure.

In a more specific sense, the invention is concerned with a process whereby normal butane is converted into iso-butane, the process involving the use of special catalysts and particular conditions of operation which favor the isomerization reactions so that relatively high yields of th iso-compound are produced.

Since the invention is concerned principally with the two 4-carbon atom paraffin hydrocarbons and their transformation, one into the other, the following table is introduced to indicate the structure and the principal physical characteristics of these two compounds:

*Properties of butanes*

| Name | Structure | B. P. | Critical temperature | Critical pressure |
|---|---|---|---|---|
| | | °C. | °C. | Atmospheres |
| n-Butane | $CH_3CH_2CH_2CH_3$ | +0.5 | 151 | 36 |
| i-Butane | $\begin{array}{c}CH_3\\ \diagdown\\ CH-CH_3\\ \diagup\\ CH_3\end{array}$ | −10.5 | 134.5 | 37 |

Butanes are produced in considerable quantities in the oil refining industry. They occur in substantial amounts in natural gases (in which the normal compound usually predominates), in refinery gases which are evolved from crude petroleum storage tanks, and in the primary distillation of crudes, and they are also present in considerable percentages in the gases produced incidental to cracking heavy petroleum fractions for the production of gasoline. In the case of cracked gas mixtures the relative proportions of iso and normal butanes vary, but the ratio of the iso to the normal compound is as a rule considerably higher than in natural gas.

Butanes may be considered as more or less marginal compounds in respect to their desirability in ordinary gasoline, that is, a certain percentage of them is essential for sufficient vapor pressure to insure ease in starting, while an excess tends to produce vapor lock. For these reasons the total percentage of 4-carbon atom hydrocarbons is commonly adjusted in conjunction with the boiling range and vapor pressure of the other gasoline components to produce a gasoline of desirable starting characteristics according to seasonal demands.

The butanes at the present time bear a further important relationship to oil refining in that their excess production is being utilized as a source of gasoline either by ordinary thermal cracking or by special catalytic dehydrogenation processes followed by polymerization in which catalysts may or may not be used. Investigations have shown that iso-butane is considerably more amenable to cracking and dehydrogenation, both with and without catalysts, than the normal compound. Considering the corresponding mono-olefins, the normal butenes are considerably more difficult to polymerize, either thermally or catalytically, than iso-butane, and it is found also that the octenes representing the dimers of the iso-butene are of higher antiknock value than those from n-butenes which holds also for the octanes produced by hydrogenation. It is, therefore, of considerable importance at the present time to convert as much as possible of the normal butane production into iso-butane, and the present invention is especially concerned with a process for accomplishing this object.

In one specific embodiment the present invention comprises the treatment of normal butane for the isomerization thereof into iso-butane with catalysts comprising aluminum chloride and hydrogen chloride at elevated temperatures and superatmospheric pressures.

We have determined that by the use of the types of catalysts mentioned, and particularly by concurrent use of considerable superatmospheric pressure, normal butane may be converted into iso-butane with a yield of as high as 60% to 65%. Evidently the use of superatmospheric pressures of the order of 5–50 atmospheres at temperatures within the range of approximately 80–200° C., besides depressing the volatilization of granular catalysts, tends also to depress numerous undesirable side reactions which would result in the formation of hydrogen and low molecular weight hydrocarbons, so that the reaction proceeds more or less in one direction until an equilibrium is established.

There will be some variations in the relative amounts of aluminum chloride and hydrogen chloride which are best under the different temperature and pressure ranges specified, but as a rule, approximately 10% by weight of aluminum chloride and a minor amount of hydrogen chloride of the order of 1–2% by weight of the reactants will be used. The determination of the optimum ratios of n-butane and the catalyst components will be a matter of trial.

The process may be operated under batch or continuous conditions. Batch operations may be conducted by separately adding aluminum chloride, hydrogen chloride and normal butane to a closed pressure container, after which the container is agitated or the contents stirred mechanically while the temperature and pressure are raised by the application of external heat to produce a temperature corresponding to maximum production of the iso-compounds. This type of operation is better adapted to small scale production, and plants of considerable capacity are best operated in a continuous manner. In continuous operations the butane may be pumped through a tubular heating element at a given temperature and pressure within the approximate ranges previously specified and reaction brought about along the line of flow by the separate or joint injection of proportioned amounts of aluminum chloride and hydrogen chloride. In the absence of moisture there will be substantially no corrosion when using these substances. After passage through the heating element the reactants may be passed to enlarged insulated chambers for the completion of the desired isomerization and the total products subsequently fractionated to recover catalysts and separate the normal and iso-butanes, after which the normal compound may be re-cycled for further treatment.

Continuous operation may also be conducted by passing normal butane mixed with hydrogen chloride through beds of heated granular aluminum chloride, either alone or mixed with carrying or spacing materials of a relatively inert character. Treatment of the products will involve merely the condensation of the hydrocarbon products and the recycling of the hydrogen chloride for further use.

The following examples are introduced to indicate in a general way the nature of the results obtainable by the use of the process, though they are not introduced with the intention of correspondingly limiting the scope of the invention.

*Example I*

100 parts by weight of normal butane, 20 parts by weight of aluminum chloride and 2 parts by weight of hydrogen chloride were introduced under a pressure of about five atmospheres into a pressure vessel, which was then rotated and heated for twelve hours at an average temperature of 150° C., the maximum pressure developed being about 30 atmospheres. After the bomb was cooled the hydrocarbons were released and fractionated and it was found that they consisted of 66.5% of iso-butane and 31.9% of normal butane. This indicates that the equilibrium under these conditions is considerably in favor of iso-butane.

*Example II*

113 parts by weight of normal butane, 20 parts by weight of substantially anhydrous aluminum chloride and an amount of hydrogen chloride necessary to produce about 5 atmospheres gauge pressure were placed in a pressure vessel and heated 12 hours at 100° C. 60.2% of isobutane was produced from the n-butane charged with substantially no side reactions.

We claim as our invention:

1. A continuous process for producing high yields of isobutane from normal butane which comprises adding hydrogen chloride to the normal butane, passing the resultant mixture through a bed of relatively inert carrier material containing aluminum chloride under conditions such that isomerization of normal butane constitutes the principal reaction in the process, and separating the resultant isobutane from the reaction mixture discharging from the catalyst bed.

2. The process as defined in claim 1 further characterized in that the normal butane is passed through the catalyst bed at an isomerizing temperature below 200° C.

3. A process for producing isobutane which comprises subjecting normal butane, in the substantial absence of polymerizable olefins, to the action of aluminum chloride and a relatively small amount of hydrogen chloride under conditions such that isomerization of normal butane constitutes the principal reaction in the process, whereby to convert a major portion of the normal butane into isobutane.

4. A process for producing isobutane which comprises subjecting normal butane to the action of aluminum chloride under conditions and in the presence of an amount of hydrogen chloride such that isomerization of normal butane constitutes the principal reaction in the process.

5. A process for producing isobutane which comprises passing normal butane and hydrogen chloride through a reaction zone maintained under isomerizing conditions and containing aluminum chloride, said conditions and the amount of the hydrogen chloride being such that isomerization of normal butane constitutes the principal reaction in the process.

6. A process for producing isobutane from normal butane which comprises adding gaseous hydrogen chloride to the normal butane, and passing the resultant mixture under isomerizing conditions through a bed of solid carrier material containing aluminum chloride, said conditions and the amount of the hydrogen chloride being such that isomerization of normal butane constitutes the principal reaction in the process.

7. A process for producing isobutane from normal butane which comprises adding hydrogen chloride to the normal butane, and contacting the resultant mixture under isomerizing conditions with substantially anhydrous aluminum chloride supported on a solid carrier material, said conditions and the amount of the hydrogen chloride being such that isomerization of normal butane constitutes the principal reaction in the process.

8. The process as defined in claim 4 further characterized in that said conditions include an isomerizing temperature below 200° C.

9. A process for producing isobutane from normal butane which comprises adding gaseous hydrogen chloride to the normal butane, and subjecting the resultant mixture under isomerizing conditions to the action of a solid catalyst comprising substantially anhydrous aluminum chloride, said conditions and the amount of the hydrogen chloride being such that isomerization of normal butane constitutes the principal reaction in the process.

VLADIMIR N. IPATIEFF.
HERMAN PINES.